No. 686,278. Patented Nov. 12, 1901.
H. W. A. FETTE.
SCREW TAP, &c.
(Application filed July 8, 1901.)

(No Model.)

Witnesses:
Edward Ray.
William Schulz.

Inventor:
Heinrich Wilhelm Adolf Fette
by Roeder & Bresen Attorneys

UNITED STATES PATENT OFFICE.

HEINRICH WILHELM ADOLF FETTE, OF ALTONA-OTTENSEN, GERMANY.

SCREW-TAP, &c.

SPECIFICATION forming part of Letters Patent No. 686,278, dated November 12, 1901.

Application filed July 8, 1901. Serial No. 67,388. (No model.)

*To all whom it may concern:*

Be it known that I, HEINRICH WILHELM ADOLF FETTE, a citizen of the German Empire, and a resident of Altona-Ottensen, Germany, have invented certain new and useful Improvements in Screw-Taps and the Like, of which the following is a specification.

Screw-taps as hitherto used, with their teeth filed off at the cutting edge, have the disadvantage that in unscrewing the tap chips get between the teeth and the thread, thereby damaging the cutting edges. Consequently such screw-taps become useless in a very short time.

The present invention relates to an improved screw-tap by means of which not only the above-mentioned drawbacks are fully avoided, but which also allows of a considerably better guidance and formation of the thread when unscrewing the tap, as the rough portions of the tap become perfectly smooth.

Figure 1:
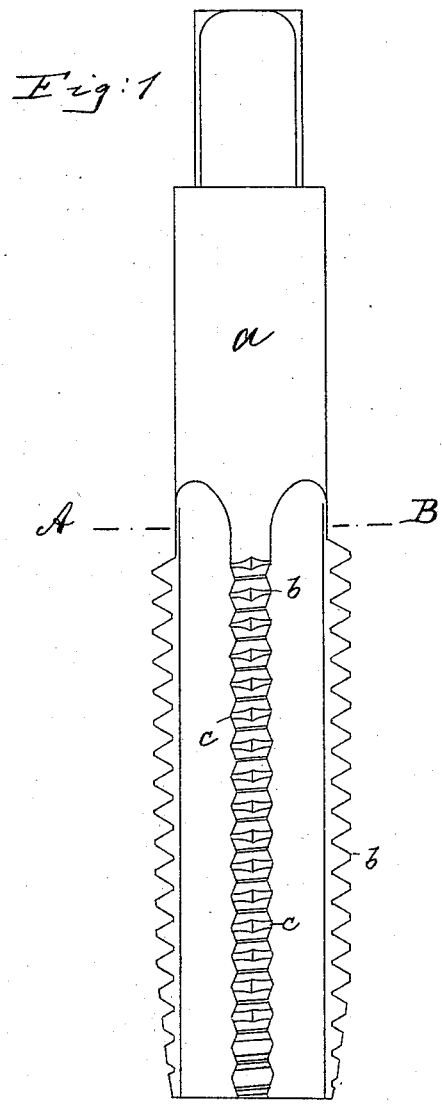
Figure 2:
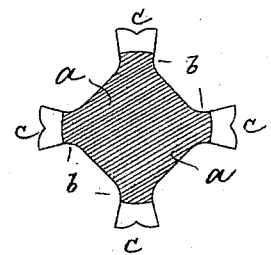

In the accompanying drawings, Figure 1 is an elevation of a screw-tap constructed according to this invention, and Fig. 2 shows a cross-section of the same on the line A B of Fig. 1.

Like letters indicate like parts throughout the drawings.

The screw-tap $a$ shown in the drawings is provided, say, with four separated rows or lines of convex teeth $b$ of as narrow width or thickness as possible in order to give them a slight elasticity. Each set of teeth has a groove $c$ extending the whole length of the tap, so that the two cutting edges of each of the two tooth-sections are located on the circumference of the same circle, while each single tooth-section slopes more or less toward the center. Each tooth thus has two cutting edges, that project at equal distances into the work-piece, and thus the tap will cut during its insertion as well as during its removal. As both edges of each tooth are accurately guided in the thread, the entrance of chips between the teeth and the female thread is avoided, and breakage of the teeth can therefore not take place.

Portions of the female thread which during cutting may appear to be rough are nicely smoothed off on unscrewing the taps.

As the screw-tap manufactured in the above-mentioned manner is very well guided, and consequently offers little friction, it is obvious that the screw-tap forming the object of the present invention has very great advantages over those hitherto used.

I claim—

1. A screw-tap provided with separated longitudinal rows of teeth, and grooves that divide each tooth into two sections, the cutting edges of which are equidistant from the center of the tap, substantially as specified.

2. A screw-tap provided with separated longitudinal rows of convex teeth, and longitudinal grooves that divide each tooth into two sections that slope toward the groove, substantially as specified.

Signed by me at Hamburg this 22d day of June, 1901.

HEINRICH WILHELM ADOLF FETTE.

Witnesses:
A. POTHS,
E. H. L. MUMMENHOFF.